March 18, 1969     H. W. GERARDE     3,433,712
CHOLINESTERASE TEST
Filed Jan. 28, 1965     Sheet 1 of 2
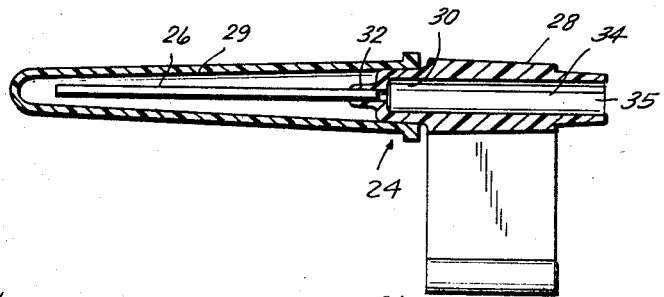
FIG. 1
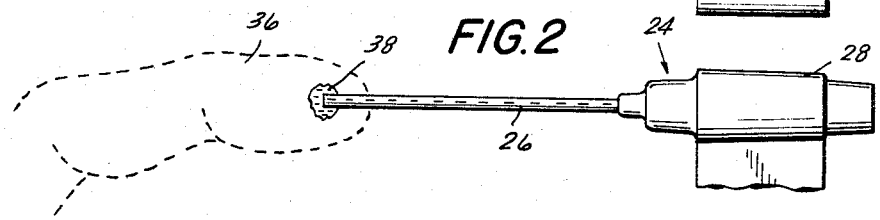
FIG. 2
FIG. 5
FIG. 4
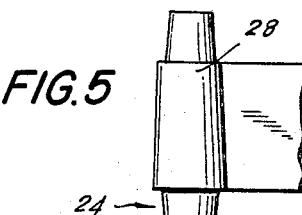
FIG. 3
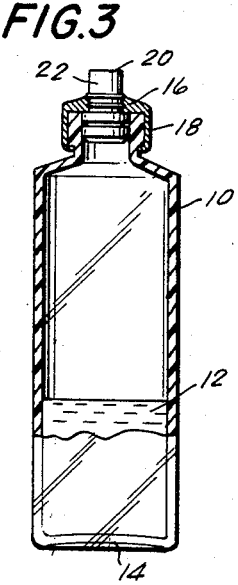
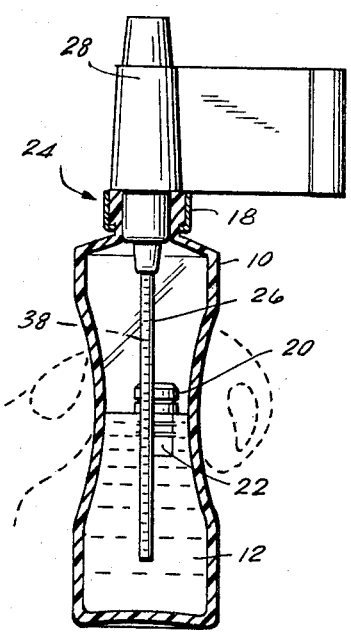
INVENTOR
HORACE W. GERARDE
BY
Kane, Dalsimer + Kane
ATTORNEYS March 18, 1969 H. W. GERARDE 3,433,712
CHOLINESTERASE TEST Filed Jan. 28, 1965 Sheet 2 of 2

INVENTOR
HORACE W. GERARDE
BY
Kane Dalsimer + Kane
ATTORNEYS

United States Patent Office 3,433,712
Patented Mar. 18, 1969

3,433,712
CHOLINESTERASE TEST
Horace W. Gerarde, 7 Rutgers Court,
Westfield, N.J. 07090
Filed Jan. 28, 1965, Ser. No. 428,748
U.S. Cl. 195—127     9 Claims
Int. Cl. G01n 33/16; C12k 1/00

ABSTRACT OF THE DISCLOSURE

A test assembly for determination of blood chlolinesterase activity, the asssembly including a first and second container, one container having a quantity of an indicator responsive to pH changes and the other container having a predetermined quantity of stabilized anhydrous solution containing acetylcholine so that upon transferring the contents of one container to the other in the presence of blood having cholinesterase therein, the acetylcholine breaks down to cause a change in pH with a resultant indication by the indicator.

---

This invention relates to an improved test for determination of blood cholinesterase activity utilizing a stabilized solution of acetylcholine and a novel assembly for performing the test.

The introduction or organic phosphate ester insecticides and the increasing use thereof has created hazards for employees handling these compounds. The compounds are not only toxic to man but are hazardous to handle bringing about a large number of non-fatal poisonings and even deaths among agricultural workers and pest control personnel. These insecticides biologically inactivate the body enzyme cholinesterase, a major factor in the function oft he nervous system. A decrease in the level of cholinesterase activity prevents cholinesterase from acting upon acetylcholine which is liberated at the nerve endings. This brings about an abnormal accumulation of acetylcholine at the nerve endings with a corresponding inability to control muscle movements. The normal pattern upon repeated exposure to the phosphate ester insecticides indicates a gradual decline in cholinesterase activity which does not present itself symptomatically until a critical level is reached.

There is presently available no convenient, simple, inexpensive test for mass testing of workers to determine blood cholinesterase activity. All prior tests require either expensive, complicated laboratory equipment, thus also requiring skilled technicians or involve inherent inaccuracies because of handling and dilution of the substrate upon use thereof.

It is an object of my invention to provide a simple and efficient test that may be easily performed at the situs of work by unskilled personnel on a large number of workers on a regular basis without the need for utilizing expensive laboratory equipment nor cumbersome techniques nor any specific skill in biochemical testing.

It is a further object of my invention to provide a novel test assembly for carrying out my cholinesterase test. Another object of my invention is to provide a cholinesterase test for determination of blood cholinesterase activity useful in ultramicro procedures.

Another object of my invention is to provide a stabilized solution of the substrate, acetylcholine, as well as an improved method of preparing said substrate.

My test method contemplates first providing a predetermined quantity of indicator responsive to changes in pH and thereafter adding to the indicator a predetermined quantity of blood. Finally, to the mixture of indicator and blood, a predetermined quantiy of an anhydrous stabilized solution containing acetylcholine is added whereby in the presence of cholinesterase in the blood, the acetylcholine breaks down to change the pH and cause a change in the indicator which may be observed visually or photometrically.

A test assembly utilized by my cholinesterase test comprises a first container having therein a predetermined quantity of an indicator responsive to pH changes and a second sealed container having a predetermined quantity of an anhydrous stabilized solution containing acetylcholine. The containers are interengageable so that the contents of one container may be mixed with the contents of the other container. In the presence of blood having cholinesterase therein, the acetylcholine breaks down to cause a change in the pH with a resultant indication by the indicator.

The substrate used for my test is an anhydrous stabilized solution containing acetylcholine.

Several embodiments of my invention and the manner of utilizing same are described herein with reference to the drawings in which:

FIG. 1 is a side elevation partially in section showing the pipette for collecting a blood specimen;

FIG. 2 is an elevational view showing the pipette in position to receive a sample of blood;

FIG. 3 is an elevational view partially in section of a container having an indicator therein;

FIG. 4 is an elevational view showing the container slightly compressed and the pipette in position just prior to the dispensing of the blood specimen into the reagent mixture;

FIG. 5 is similar to FIG. 4 showing the pipette being withdrawn from the container after the dispensing of the blood specimen therein;

Figure 6:
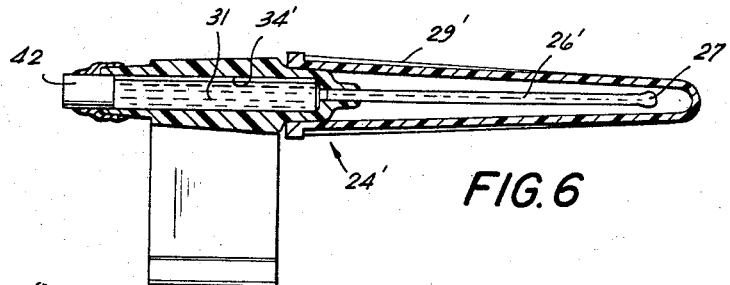
FIG. 6 is a side elevation partially in section showing the substrate sealed within the chamber of another pipette assembly.

In the drawings, I have shown a container 10 having a reagent indicator 12 therein, a first pipette 24 for collecting blood and adding it to the indicator and a second pipette 24' which holds the stabilized, anhydrous solution containing acetylcholine.

Figures 8, 9:
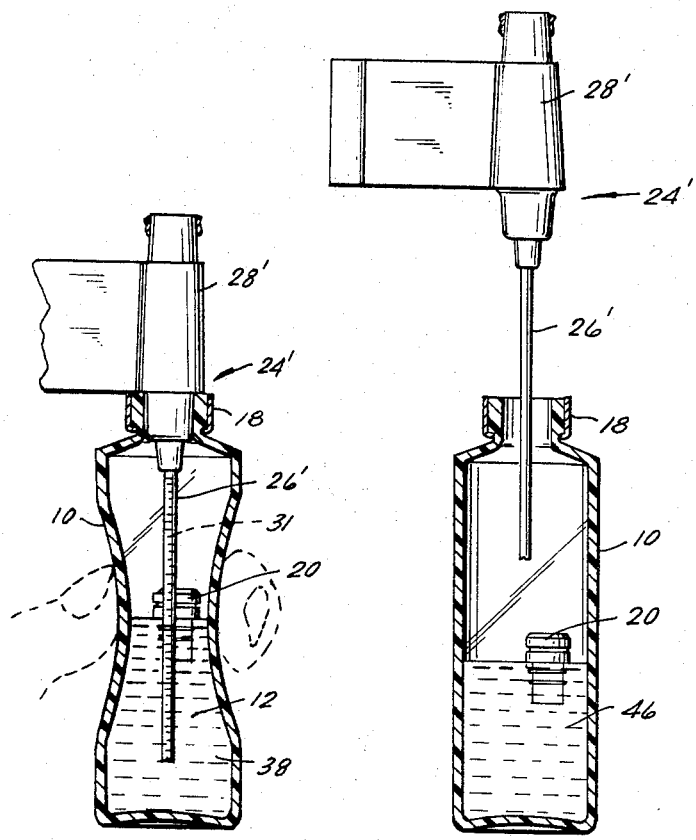
FIG. 8 is a view similar to FIG. 4 showing the container slightly depressed prior to the dispensing of the substrate into the mixture of reagent and blood contained therein.
FIG. 9 is a view similar to FIG. 5 showing the pipette being withdrawn from the container after the dispensing of the substrate therein.

The container is made of a flexible resilient material such that it can be compressed and will automatically re-expand upon release of the compression thereon. The container 10 is shown in its compressed state in FIGURES 4 and 8 and in its normal state in FIGURES 3, 5 and 9. It is conveniently made of any suitable plastic material which is impervious to and unaffected by any of the materials with which it may come in contact and which has the characteristics described above. Polyethylene, polytetrafluoroethylene, polychlorotrifluoroethylene, polymers and copolymers of vinyl chloride are all suitable materials. I prefer to use polyethylene. The container is preferably small in size so that it will be useful for ultramicro procedures. However, it may be of a larger configuration if these procedures are not indicated. It is preferably translucent so that reaction changes may be readily observed therein.

The container may be of cylindrical configuration and has a closed end 14 and an open end 16 which may be sealed in any convenient manner. The embodiment shown in the drawings has a neck portion 18 at its open end into which is inserted a plug 20 made of a suitable resilient material possessing the same characteristics as the material comprising the container. Thus, any of the aforementioned materials may be utilized as well as rubber. The external diameter of the neck portion is less than the outside diameter of the container to permit easy association of parts of the test assembly as will be hereinafter explained.

The plug 20 may be conveniently colored to indicate the type of indicator in the container or for any other identification purposes. It has an outside diameter greater than the inside diameter of the neck portion 18 of the open end 16 of the container and when in position in the neck, it effectively seals the open end of the container to prevent leakage of any fluid therefrom. As indicated above, it is made of a suitable resilient material. Thus, upon applying pressure to the top portion 22 of the plug, it can be forced into the container and serve as a mixing bead.

For the collection of a predetermined quantity of blood, I have provided a first capillary pipette opened at both ends thereof indicated generally by the numeral 24, and shown in FIGURES 1, 2, 4 and 5. The pipette has a capillary tube 26 having an open end and being of a size and shape such that it will receive a predetermined quantity of blood. The capillary tube should be made of a material such that when in use during the collection of blood, it will not break. I prefer to use glass; however, any suitable plastic material inert to and unaffected by blood and other liquids with which it may come in contact and having the above characteristics may be utilized. The tube has a uniform bore of small diameter and a predetermined length corresponding to a predetermined volume such that said predetermined volume may be achieved by filling the bore with liquid. In view of the small diameter of the tube, it will function as a capillary and thus, the liquid will rise into the tube such that it completely fills said tube. The tube will have a bore surface that is clean. The outside diameter of the tube 26 should be less than the area of a drop of blood into which its outer end will be placed in contact. Thus, the pipette will have a capillary tube in which the capacity of the tube is in direct relationship to its length.

The inner end of the capillary tube 26 is mounted within a sleeve 28 in any suitable manner. The sleeve may be formed of a resin or plastic inert to the materials with which it will come in contact, although other suitable materials may be used. Adjacent the forward end of sleeve 28 is a zone of reduced diameter 30 defining a coupling fitting. The coupling fitting has a tapered outside diameter such that it will fit snugly into the open end of the container during the test. Adjacent the forward end of the coupling fitting is a further zone of reduced diameter 32 having a bore of a diameter which snugly receives the inner end of the capillary tube 26 which is secured in this position in any desired fashion with its inner end terminating adjacent the interior of the coupling fitting and sleeve. The interior of the sleeve provides a reservoir chamber 34 that is in communication with the end of the capillary tube and which is open at its outer end 35.

A sheath 29 encloses tube 26 to protect the tube from accidental breakage thereof. The sheath may be conveniently mounted as by friction on the coupling portion 30 of the sleeve 28. It may be made of any suitable relatively rigid material.

When in use, the sheath 29 is removed from the capillary pipette assembly and a finger 36 of the individual to be tested is pricked so as to cause blood to flow therefrom as indicated in FIGURE 2. The capillary tube is left in position until the predetermined quantity of blood has entered therein and is then removed from the finger. The plug 20 of the container 10 having the reagent therein is forced into the container thus leaving the neck end of the container open, whereupon the container is compressed as shown in FIGURE 4 and the end of the capillary tube is inserted through the neck with the coupling fitting in engagement with the open ended neck portion of the container. Compression is relieved while keeping the pipette in position, thus bringing about the dispensing of the sample of blood 38 into the reagent. In this connection, the initial compression of the container is accomplished before engagement of the coupling fitting with the neck of the container. The release and expansion are accomplished after the fitting is in engagement with the neck. Compression and relaxation may be repeated several times to flush the capillary of any blood remaining therein. Thereafter, the capillary pipette assembly is removed.

Figure 7:
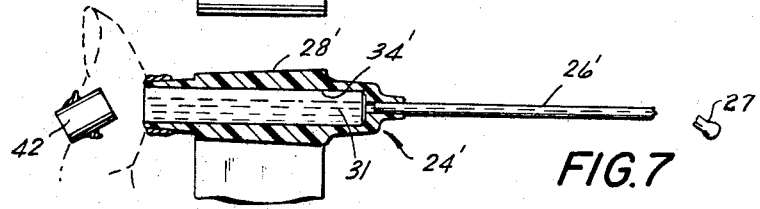
FIG. 7 is a side elevational view partially in section illustrating the preparation of the pipette prior to the dispensing of the substrate.

A second capillary pipette 24' as shown in FIGURES 6, 7, 8 and 9, is provided which is sealed at both ends thereof. Thus, the capillary tube 26' may have one end closed. The rear end of the sleeve 28' may be conveniently sealed with a plug-like portion 42 such that the reservoir 34 of the sleeve is not affected by moisture or any other outside elements. In the reservoir, I have provided a predetermined quantity of a stabilized, anhydrous solution 31 containing acetylcholine, the substrate for my invention. The capillary pipette is formed so that it can be opened at both ends as indicated in FIGURE 7 wherein the closed end 27 of the tube may be broken off and the plug 42 at the rear end of the sleeve may be forced out of position as by with the thumb. After the opening of the opposite ends of the capillary pipette, the insertion of the same is immediately made into the container 10 now having a mixture of indicator 12 and blood 38 in the same fashion as the first capillary pipette was placed in the container for the dispensing of the blood sample therefrom as mentioned above. Thus, the container is first compressed and the capillary pipette inserted into the container such that the coupling fitting is placed snugly in the neck portion of the open end of the container. Compression is released to bring the substrate into the indicator and blood mixture. Compression and relaxation are repeated to ensure that all the substrate is now in the mixture. The capillary pipette is removed from the container and the reaction of the mixture therein observed, either visually or photometrically by means of a colorimeter or a colorimetric photometer.

My cholinesterase test is based on the conversion of acetylcholine to acetic acid and choline by the action of the cholinesterase enzyme present in the blood. The acetic acid formed changes the color of an indicator 12 present in the container 10. I prefer to use brom thymol blue (3'3"-dibromothymol sulfonephthalein) as the indicator. However, other suitable indicators may be used such as phenol red (phenolsulfonephthalein) and m-nitrophenol. A graduation of colors indicates the percentage of cholinesterase activity in the blood. These color changes can be measured photometrically or visually by observance of the reaction mixture 46 (FIG. 9) in the translucent container 10.

When brom thymol blue is used, the following table illustrates the color changes and corresponding percentage of cholinesterase activity in the blood:

*Relationship of color to cholinesterase activity of whole blood using brom thymol blue*

| Color: | Percent of cholinesterase |
|---|---|
| Orange | 100 |
| Brown | 75 |
| Olive brown | 50 |
| Olive green | 25 |
| Green | 0 |

If the blood cholinesterase activity is 75% or less, the worker should be immediately removed from further contact with the organic phosphate ester insecticides until his cholinesterase activity level has reached the normal limits, namely above 75%.

The method contemplates first providing a predetermined quantity of an indicator in a container such as that illustrated by the numeral 10 in the drawings. To this indicator is added a predetermined quantity of blood and finally to this resultant mixture, a predetermined quantity of a stabilized anhydrous solution containing acetylcholine. The provision of this stabilized solution or substrate is an important factor in making my test practical. The acetylcholine will, in the presence of cholinesterase in the blood, break down as indicated above to acetic acid and choline. The acidity or low pH in turn changes the color of an indicator such as brom thymol blue from which one may determine the activity of cholinesterase in the blood.

Blood diluted with brom thymol blue retains its cholinesterase activity for approximately 8 hours, thus it is not necessary to immediately add the substrate. This makes mass testing possible for the technician. In addition, the stabilized anhydrous solution containing acetylcholine will remain stable if kept in the anhydrous state for an indefinite period of time.

My improved substrate comprises a stabilized anhydrous solution containing acetylcholine. As a solvent, I prefer to employ anhydrous neutral ethylene glycol. However, I may employ other anhydrous neutral organic solvents which are inert to the blood, the cholinesterase, acetylcholine and the indicator. Other suitable solvents are propylene glycol and dioxane. The stabilized acetylcholine can be provided by dissolving acetylcholine chloride in the solvent. While I prefer to use acetylcholine chloride, other salts such as acetylcholine iodide, acetylcholine bromide, and acetylcholine perchlorate may be utilized.

The following example illustrates the preparation of the substrate:

EXAMPLE I

*Preparation of stabilized, anhydrous solution of acetylcholine chloride for cholinesterase test*

(1) *Preparation of anhydrous neutral ethylene glycol.*— To a 1 pt. bottle of ethylene glycol, add 25 grams of anhydrous sodium sulfate ($Na_2SO_4$) and 5 grams of marble chips (calcium carbonate—ca. ¼″ size). Shake the mixture vigorously and allow it to stand for 3–4 days, shaking periodically. The mixture is allowed to settle for a day whereupon the supernate is decanted.

(2) *Preparation of solution or substrate.*—10 grams of acetylcholine chloride (Merck 20996) is dissolved in 120 ml. of the above prepared anhydrous neutral ethylene glycol (supernate). A final volume of 125 ml. is obtained by adding the anhydrous neutral ethylene glycol to this point.

In the preparation of the substrate, any of the abovementioned solvents may be substituted in place of the anhydrous neutral ethylene glycol, and any of the abovementioned salts of acetylcholine may be substituted for acetylcholine chloride.

The following is an example of the preparation of a test assembly embodying my invention:

EXAMPLE II

*Preparation of a test assembly for determination of blood cholinesterase activity*

In a container of the type indicated at 10 having an approximate capacity of 3 ml., place 1 ml. of brom thymol blue (3′3″-dibromothymol sulfonephthalein). Seal the container with a stopper 20.

Provide a capillary pipette 24 with a capillary tube 26 having a capacity of 20 µl. and with a sheath 29 applied thereto.

Provide a capillary pipette 24′ with the outer end of the capillary tube 27 closed or sealed as shown, having a sheath 29′ applied thereto. Insert 4 mg. equivalent of acetylcholine chloride (in the form of the stabilized anhydrous solution of acetylcholine chloride mentioned in Example 1) in the reservoir 34′ and seal the end with stopper 42.

The entire assembly may be packaged together and shipped to the desired destination and stored for future use.

In the above example, any of the other color indicators responsive to changes in pH may be employed.

The folowing is an example of a test for determination of blood cholinesterase activity using my test assembly:

EXAMPLE III

*Test for determination of blood cholinesterase activtiy*

The test assembly described in Example II is used in the following example.

Remove the sheath 29 from the blood collecting pipette 24 and place the outer end of the capillary tube in a drop of blood on the punctured finger of a patient or worker to be tested to collect 20 ul. of blood in the pipette.

After collection of the blood, the plug 20 is forced into the container 10 having the indicator therein so that the neck end of the container is now open. The container is compressed and the end of the capillary tube 26 inserted through the neck so that the coupling fitting 24 is in snug engagement with the neck. With the pipette in position, compression of the container is relieved and then repeated and released so as to dispense all of the blood from the pipette into the indicator.

The tip 27 of the second capillary pipette containing the stabilized anhydrous solution of acetylcholine chloride is broken off. Plug 42 is removed therefrom and the capillary pipette inserted into the container having the mixture of indicator and blood therein in the same manner as mentioned immediately above so that all of the substrate, stabilized anhydrous solution of acetylcholine chloride is dispensed into the mixture of blood and indicator.

The resultant mixture of blood, indicator and substrate is incubated in the axilla or in a water bath at 37° C. for 28 minutes.

After incubation, the mixture is observed for color change and compared with a color chart similar to that described above when brom thymol blue (3′3″-dibromothymol sulfonephthalein) is used as the indicator.

It will thus be seen that I have provided a novel test useful in ultramicro procedures for the determination of cholinesterase activity in the blood, utilizing a stabilized substrate in the form of a stabilized, anhydrous solution containing acetylcholine and the method of preparing this solution. In addition, I have described a novel test assembly for carrying out the cholinesterase test.

Modifications may be made in the illustrated and described embodiments of my invention as for instance, by using different color indicators, by varying the specific shape or configuration of the different parts, by varying the means used for retaining the parts in assembled relationship, by varying the structure for retaining a substrate in the capillary pipette and the cooperation of the parts of my test assembly or by varying proportionally the quantities of materials used in conducting the tests.

I claim:

1. A test assembly for determination of blood cholinesterase activity comprising a first container having therein a predetermined quantity of an indicator responsive to pH changes and a second sealed container having a predetermined quantity of a stabilized anhydrous solution containing acetylcholine, one of said containers being made of a flexible resilient material whereby it can be compressed and will automatically re-expand, coupling means formed on said containers and being interengageable so that the contents of one container may be mixed with the contents of the other container so that in the presence of blood having cholinesterase therein, the acetylcholine breaks down to cause a change in the pH with a resultant indication by the indicator.

2. A test assembly for determination of blood cholinesterase activity as set forth in claim 1 in which the indicator is a color indicator selected from the group consisting of 3′3″-dibromothmol sulfonephthalein, phenolsulfonephthalein and m-nitrophenol.

3. A test assembly for determination of blood cholinesterase activity as set forth in claim 1 in which the stabilized anhydrous solution is an anhydrous solution of acetylcholine chloride in neutral ethylene glycol.

4. A test assembly for determination of blood cholinesterase activity comprising a container made of a flexible resilient material whereby it can be compressed and will automatically re-expand having therein a predetermined quantity of an indicator responsive to pH changes, a first capillary pipette for the collection of a predetermined quantity of blood and the insertion thereof into the indicator of the container, and a second sealed capillary pipette having a predetermined quantity of a stabilized anhydrous solution containing acetylcholine and being formed so that it can be opened to add the stabilized anhydrous solution to the mixture of indicator and blood, coupling means formed on said container and said first and second capillary pipettes and being interengageable so that the contents of the pipettes may be transferred to the flexible resilient container so that in the presence of cholinesterase in the blood the acetylcholine breaks down to cause a change in the pH with a resultant indication by the indicator.

5. A test assembly for determination of blood cholinesterase activity as set forth in claim 4 in which the indicator is a color indicator selected from the group consisting of 3′3″-dibromothymol sulfonephthalein, phenolsulfonephthalein and m-nitrophenol.

6. A test assembly for determination of blood cholinesterase activity as set forth in claim 4 in which the stabilized anhydrous solution is an anhydrous solution of acetylcholine chloride in neutral ethylene glycol.

7. A test assembly for determination of blood cholinesterase activity comprising a container made of a flexible resilient material whereby it can be compressed and will automatically re-expand and having an opening with a removable closure applied thereto, said container having a predetermined quantity of a liquid color indicator responsive to changes in pH, a first capillary pipette formed with a capilalry tube, with a coupling fitting formed therearound whereby the capillary tube can be inserted through the opening in the container and the fitting coupled thereto so that blood can be colected in said pipette and drawn into said container by compressing said container and causing it to expand when the pipette is coupled thereto and a second similar capillary pipette sealed at both ends and having a capillary tube with a coupling fitting formed therearound, said second pipette containing a predetermined quantity of a stabilized anhydrous solution containing acetylcholine and formed so that it can be opened at both ends whereby the fitting can be coupled to the container when the tube is inserted through the opening therein and the acetylcholine can be drawn into the container to cause it to break down in the presence of cholinesterase in the blood to cause a change in the pH with a resultant indication by the indicator.

8. A test assembly for determination of blood cholinesterase activity as set forth in claim 7 in which the indicator is a color indicator selected from the group consisting of 3′3″-dibromothymol sulfonephthalein, phenolsulfonephthalein and m-nitrophenol.

9. A test assembly for determination of blood cholinesterase activity as set forth in claim 7 in which the stabilized anhydrous solution is an anhydrous solution of acetylcholine chloride in neutral ethylene glycol.

References Cited

UNITED STATES PATENTS 2,773,521   12/1956   Persson.

OTHER REFERENCES

Wilson, O. C., et al., "Organic Chemistry in Pharmacy," p. 125, J. P. Lippincott Co., Philadelphia, 1949.

Weissberger, A., ed., "Technique of Organic Chem.," vol. III. Chapt. VI, pp. 814–816, Interscience, New York, 1956.

Sandi, E., Chem. Abs., 55, 12520e (1961).

Glick, D., ed., "Methods of Biochemical Analysis," vol. V, pp. 29, 32, 36–37, Interscience, New York, 1957.

MORRIS O. WOLK, *Primary Examiner.*

S. MARANTZ, *Assistant Examiner.*

U.S. Cl. X.R.

23—230; 141—114; 195—103.5; 206—43, 47; 222—211